US009047693B2

United States Patent
Adachi et al.

(10) Patent No.: US 9,047,693 B2
(45) Date of Patent: Jun. 2, 2015

(54) COLOR DISTRIBUTION DESIGN ASSISTANCE SYSTEM

(75) Inventors: Takashi Adachi, Wako (JP); Kazuyuki Hagiwara, Wako (JP); Osamu Watabe, Wako (JP); Yuri Kakihara, Wako (JP); Masayuki Osumi, Yokohama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/239,633

(22) PCT Filed: Jul. 10, 2012

(86) PCT No.: PCT/JP2012/067591
§ 371 (c)(1),
(2), (4) Date: Feb. 19, 2014

(87) PCT Pub. No.: WO2013/035428
PCT Pub. Date: Mar. 14, 2013

(65) Prior Publication Data
US 2014/0168251 A1    Jun. 19, 2014

(30) Foreign Application Priority Data
Sep. 9, 2011   (JP) .................................. 2011-197662

(51) Int. Cl.
*G06T 11/00*   (2006.01)
*G06T 19/20*   (2011.01)
(Continued)

(52) U.S. Cl.
CPC ............... *G06T 11/001* (2013.01); *G06T 19/20* (2013.01); *Y02T 10/82* (2013.01); *G06T 15/04* (2013.01); *G06T 15/80* (2013.01); *G06T 2219/2012* (2013.01); *G06T 2210/56* (2013.01)

(58) Field of Classification Search
None
See application file for complete search history.

(56) References Cited

U.S. PATENT DOCUMENTS

| | | | | |
|---|---|---|---|---|
| 5,917,541 | A | * 6/1999 | Nakagome et al. | 348/93 |
| 2007/0250273 | A1 | * 10/2007 | De Haas et al. | 702/22 |
| 2012/0098845 | A1 | * 4/2012 | Kirchner et al. | 345/582 |

FOREIGN PATENT DOCUMENTS

| | | |
|---|---|---|
| JP | 2005-071326 | 3/2005 |
| JP | 2005-196477 | 7/2005 |

(Continued)

OTHER PUBLICATIONS

McCamy, C. S. "Observation and measurement of the appearance of metallic materials. Part I. Macro appearance." Color Research & Application 21.4 (1996): 292-304.*

(Continued)

*Primary Examiner* — Joni Richer
*Assistant Examiner* — Yi Wang
(74) *Attorney, Agent, or Firm* — Rankin, Hill & Clark LLP

(57) ABSTRACT

Provided is a system to assist in designing of color distribution on an object surface while considering the relationship between characteristics of a particle group contained in the paint and the design effect or texture at the object surface achieved by the particle group. The system is configured to calculate and display color distribution in accordance with variation angle at the object surface so as to reflect the texture or design effect at the object surface achieved by the particle group based on the designated distribution mode of the particle group included in the coating layer at the object surface as well as designated shape characteristics and optical characteristics of the particles making up the particle group and based on color distribution in accordance with variation angle at the object surface stored.

6 Claims, 7 Drawing Sheets

(51) Int. Cl.
  *G06T 15/04*  (2011.01)
  *G06T 15/80*  (2011.01)

(56)  References Cited

FOREIGN PATENT DOCUMENTS

| JP | 2006-208333 | 8/2006 |
| JP | 2006-277555 | 10/2006 |
| JP | 2007-219629 | 8/2007 |

OTHER PUBLICATIONS

Günther, Johannes, et al. "Efficient acquisition and realistic rendering of car paint." Vision, Modeling, and Visualization. vol. 5. 2005.*
Touloukian et al., Purdue University, Thermophysical Properties of Matter, vol. 7: Thermal Radiative Properties of Metals, Plenum, New York, 1970: pp. 15a-16a.*
Measurement of Granularity of Metallic Materials, Kazuya Kiyoi et al., Journal of the Color Science Association of Japan, Mar. 1, 2006, vol. 30, No. 1, pp. 9 to 15, Listed in International Search Report, English abstract included.

* cited by examiner

FIG.7A

BRIGHT MATERIAL PARTICLES LYING ⟷ BRIGHT MATERIAL PARTICLES STANDING

BRIGHT MATERIAL PARTICLES HAVING HIGH TRANSMITTANCE ⟷ BRIGHT MATERIAL PARTICLES HAVING LOW TRANSMITTANCE

FINE BRIGHT MATERIAL PARTICLES ⟷ ROUGH BRIGHT MATERIAL PARTICLES

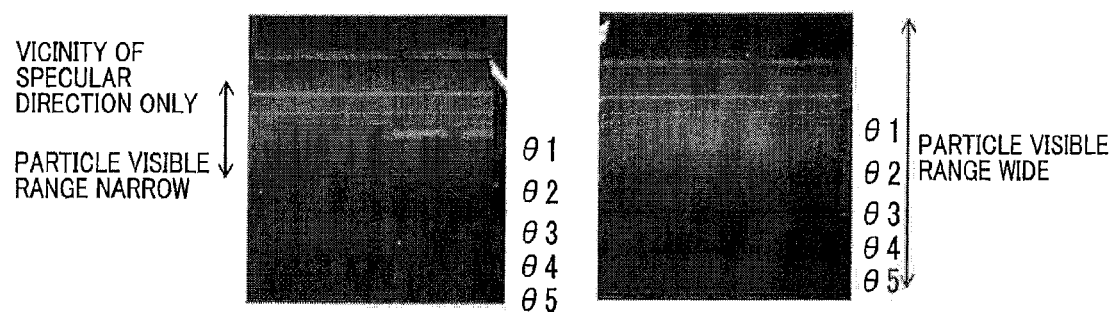

VICINITY OF SPECULAR DIRECTION ONLY

PARTICLE VISIBLE RANGE NARROW $\theta 1$
$\theta 2$
$\theta 3$
$\theta 4$
$\theta 5$ $\theta 1$
$\theta 2$ PARTICLE VISIBLE RANGE WIDE
$\theta 3$
$\theta 4$
$\theta 5$

FIG.7B

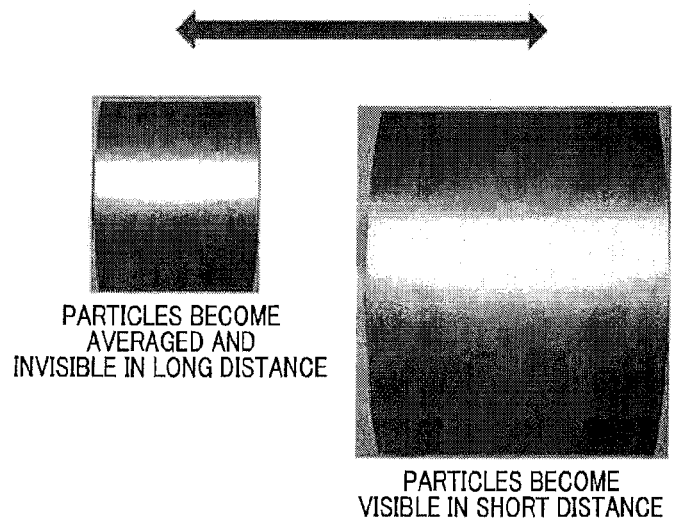

PARTICLES BECOME AVERAGED AND INVISIBLE IN LONG DISTANCE

PARTICLES BECOME VISIBLE IN SHORT DISTANCE

COLOR DISTRIBUTION DESIGN ASSISTANCE SYSTEM

TECHNICAL FIELD

The present invention relates to a technique to assist in designing color distribution on an object.

BACKGROUND ART

A method is proposed to assist a designer in developing color of a product such as an automobile body by displaying color distribution on the surface of the product on a display based on variation angle spectral reflectance (see Patent Literature 1).

CITATION LIST

Patent Literature

Patent Literature 1: Japanese Patent Application Laid-Open No. 2005-071326

SUMMARY OF INVENTION

Technical Problem

Such color developing process, however, does not consider the relationship between characteristics of particles such as a bright material contained in paint and the design effect or texture at the surface of the object in detail, and so it may be difficult to design the paint for the object surface having color distribution as the designer intended.

Then, it is an object of the present invention to provide a system to assist in designing color distribution on an object surface while considering the relationship between characteristics of a particle group contained in the paint and the design effect or texture at the object surface achieved by the particle group.

Solution to Problem

A color distribution design assistance system of the present invention includes: a storage device configured to store color distribution in accordance with variation angle of a coating layer of an object surface, a distribution mode of a particle group included in the coating layer, and shape characteristics and optical characteristics of particles making up the particle group; an input device enabling virtual designation of information on a design effect at the object surface; a calculation element configured to perform conversion into information equal to actual data in response to the virtual designation of information on a design effect via the input device, perform calculation of a ratio of the particles that become invisible in accordance with variation angle of the object surface depending on the optical characteristics of the particles due to surface reflection at a part covered with pigment made up of invisible microparticles in the coating layer, and perform calculation of a smoothness change in accordance with a distance and a direction where particles included in a pigment layer become invisible due to resolution of eyes, thus calculating color distribution in accordance with variation angle of the object surface; and an output device configured to display the color distribution in accordance with variation angle of the object surface that is calculated by the calculation element.

According to a color distribution design assistance system of the present invention, a distribution mode of a particle group included in a coating layer of the object surface as well as shape characteristics and optical characteristics of particles making up the particle group are designated via the input device. Then, the calculation element calculates color distribution in accordance with variation angle at the object surface reflecting texture or design effect due to the existence of the particle group based on the designated factors and color distribution in accordance with variation angle at the object surface stored in the storage device. Then, the output device displays the calculation result. This can assist a designer in designing color distribution at the object surface while considering the relationship between the characteristics of the particle group included in paint and the design effect or texture at the object surface achieved by the particle group.

Information of such designated distribution mode of the particle group as well as designated shape characteristics and designated optical characteristics of the particles can be used when choosing a particle group to be included in paint to implement color distribution as the designer intended and accordingly can be used as direct guideline to design the paint. In this way, this can bring efficiency to develop paint.

The output device preferably is configured to draw disappearance angle of particles due to Fresnel reflection resulting from refraction at a pigment layer made up of invisible microparticles and transmittance for each particle with a scattering degree of the particles, and the calculation element is configured to remove particles that become invisible in accordance with disappearance angle and perform calculation to contribute to a design effect of coating color only.

The thus configured color distribution design assistance system allows a designer to recognize dispersion or scattering degree in a normal direction of particles assumed to have a flat-plate shape and a relationship with color distribution in accordance with variation angle at the object surface including texture resulting from the particles. As a result, a designer can be assisted in designing of color distribution at the object surface while allowing the designer to consider the fact that the color of the particles included in the coating layer such as lightness depends on the attitude of the particles with respect to the incident direction and the visual line direction.

Preferably the input device is configured to enable designation of a space between the object surface and a view point facing the object surface, and the calculation element is configured to correct the optical characteristics so that transmittance included in the optical characteristics of the particles making up the particle group increases with an increase in the space designated via the input device, and then calculate color distribution in accordance with variation angle of the object surface based on the corrected optical characteristics.

The thus configured color distribution design assistance system allows a designer to recognize the relationship between distance of the view point from the object surface and the color distribution in accordance with variation angle at the object surface, including texture of the object surface resulting from the particles included in the coating layer. As a result, a designer can be assisted in designing of color distribution in accordance with variation angle of the object surface while considering the fact that the color of the particles included in the coating layer such as lightness depends on the distance of the view point from the object.

Preferably the storage device is configured to store a plurality of sample images each indicating a state at the coating layer of a different particle group of a plurality of the particle groups that are different from each other in at least a part of a distribution mode and shape characteristics and optical characteristics of particles making up the particle groups, the output device is configured to display the plurality of sample images stored in the storage device, and the input device is configured to enable virtual designation of the distribution mode of the particle group as well as the shape characteristics and the optical characteristics of the particles making up the particle group by designation from the plurality of sample images displayed on the output device.

The thus configured color distribution design assistance system can simplify designing of the color distribution including texture at the object surface using sample images.

Preferably the input device is configured to enable designation of color in accordance with a plurality of designated variation angles of the coating layer, and the calculation element is configured to calculate color distribution in accordance with variation angle of the coating layer including color distribution in a variation angle range other than the designated variation angles by interpolation based on a designated color corresponding to the designated variation angles via the input device.

The thus configured color distribution design assistance system enables the output device to display a calculation result of the color distribution in accordance with variation angle at the object surface in response to designation of color at designated variation angle of the coating layer at the object surface via the input device. This enables assisting a designer in designing of color distribution at the object surface while considering the relationship between the base characteristics of paint and the design effect achieved by the paint at the object surface. Further, information on designated color corresponding to designated variation angle can be used as guideline to develop the paint, and so this can bring efficiency to develop paint.

BRIEF DESCRIPTION OF DRAWINGS

FIG. 7 describes a display mode of a calculation result of the second color distribution.

DESCRIPTION OF EMBODIMENTS

Configuration of Color Distribution Design Assistance System

Figure 1:
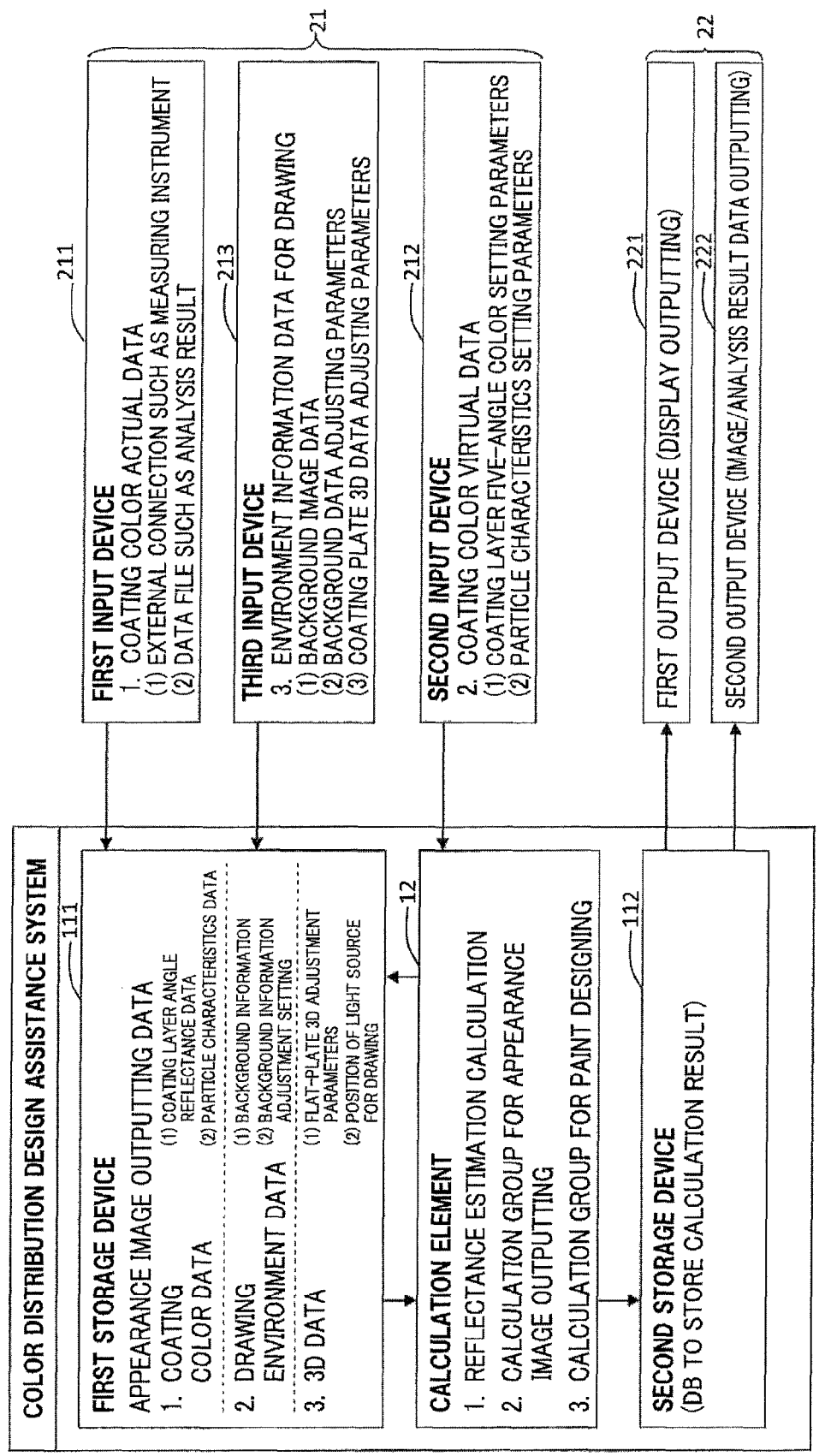
FIG. 1 describes the procedure by a color distribution design assistance system that is one embodiment of the present invention.

A color distribution design assistance system that is one embodiment of the present invention shown in FIG. 1 is configured with a computer. The color distribution design assistance system includes a first storage device 111, a second storage device 112, a calculation element 12, a first input device 211, a second input device 212, a third input device 213, a first output device 221 and a second output device 222.

The first storage device 111 and the second storage device 112 are configured with a memory and a file server, and constitute a "storage device" of the present invention that stores data and software necessary to calculate color distribution. The first input device 211, the second input device 212 and the third input device 213 are configured with a mouse pointer and a keyboard for information inputting, a port to extract information from an externally connected device such as a measuring instrument, and constitute an "input device" of the present invention. The first output device 221 and the second output device 222 are configured with a display device, for example, to output and display an image, numeric data and the like indicating color distribution of an object as well as an image representing an interface for manipulation, and constitute an "output device" of the present invention.

The first storage device 111 is configured to store background information that is an environmental element necessary to visually recognize color of an object and its optical information as well as shape characteristics of the object surface to check a change when visually recognizing the color of the object. Specifically the first storage device 111 is configured to store color distribution in accordance with variation angle of a coating layer itself at the surface of the object and a distribution mode of a particle group contained in the coating layer (spatial distribution mode and particle-size distribution mode as needed) as well as shape characteristics and optical characteristics of particles making up the particle group.

For instance, the first storage device 111 stores "appearance image outputting data" including "coating color data", "drawing environment data" and "3D data". The "coating color data" includes "coating layer angle reflectance data" and "particle characteristics data (shape and optical characteristics)". The "drawing environment data" includes "background information" and "background information adjustment setting (in the case where a clear layer is fixed, this includes optical information such as an image reflection rate, reflected image lightness and reflected image γ value (master, RGB)". The "3D data" includes "flat-plate 3D adjustment parameters (including a bending ratio of a flat plate, initial values such as a view angle, and the like)" and "position of light source for drawing (including an incident angle, luminance of light source and the like)".

The second storage device 112 is configured to store a result of calculation by the calculation element 12. The second storage device 112 stores, as color information, color distribution that is created from five-angle reflectance data of the coating layer as well as a combination of shape characteristics and optical characteristics of particles. When the color information is stored, a thumbnail image may be output via the first output device 221, and a name may be assigned to the color information together with an image thereof and stored in the second storage device 112.

The first input device 211 is configured to receive an input from an external device such as a measuring instrument to the system, including "actual data" for coating color at the surface of the object and a data file such as an analysis result.

The second input device 212 is configured to allow a designer to input "virtual data" that is a basis of simulation calculation by the calculation element 12. The "virtual data" includes "coating layer five-angle color setting parameters" and "particle characteristics setting parameters".

The third input device 213 is configured to allow a designer to input "environmental information data for drawing". The "environmental information data for drawing" includes "background image data", "background data adjusting parameters" and "color card 3D data adjusting parameters".

The calculation element 12 includes a CPU (central processing unit) and a GPU (image data processing integrated circuit) that are components of a computer. The calculation element 12 is configured to execute reflectance estimation calculation, particle appearance effect calculation and computer graphics calculation, thus executing drawing simulation calculation for the object surface.

The "reflectance estimation calculation" refers to calculation to convert virtual data input through the second input device 212 into data equal to the actual data input through the first input device 211.

The "particle appearance effect calculation" is calculation to represent the effect such that particles become invisible gradually with an increase in distance from the view point to the object surface. This calculation uses color distribution in accordance with variation angle of the coating layer itself of the object surface and a distribution mode of a particle group contained in the coating layer as well as shape characteristics and optical characteristics of particles making up the particle group. The calculation further uses transparency of particles in accordance with variation angle at the object surface depending on optical characteristics of the particles and surface reflection at a part covered with pigment or the like that is made up of invisible particles of the coating layer. The calculation assumes that the particles making up the particle group is shaped like a flat plate.

The calculation element 12 is configured to use primary-color information of the paint stored in the first storage device 111, thus calculating approximate formulation information that can be reproduced from primary colors of the object color, and output the approximate formulation information.

The calculation element 12 "configured" to execute certain calculation refers to "programming" to make a CPU and a GPU read necessary data and software from a storage device such as a memory, and then execute arithmetic processing of the data in accordance with the software and output externally or store the result of the arithmetic processing.

Figure 2:
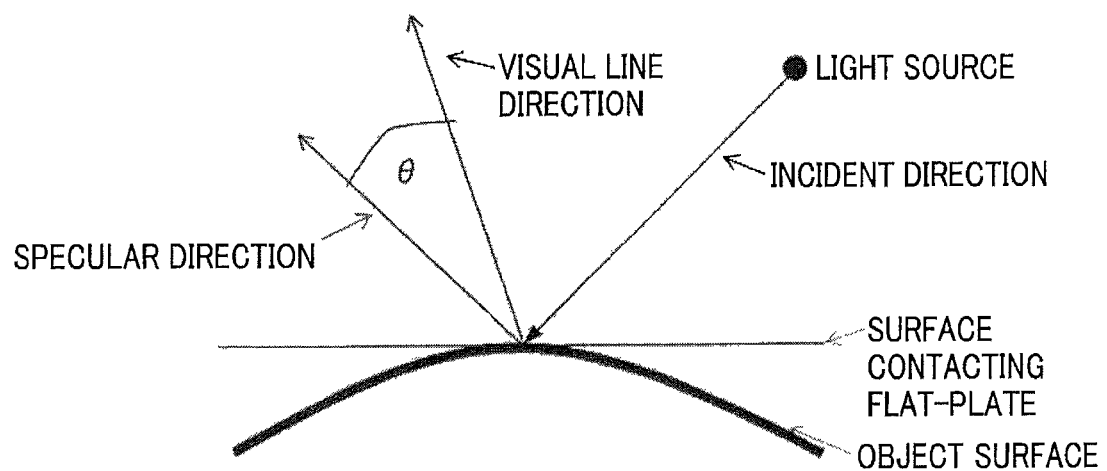
FIG. 2 describes variation angle.

As shown in FIG. 2, variation angle θ is an angle between the visual line direction and the specular direction at the object surface of light emitted from a light source.

The first output device 221 is configured to display output information from the calculation element 12. The second output device 222 is configured to execute outputting of the output information using another file or print outputting of the same. In each of the first output device 221 and the second output device 222, graph display that is one of analysis results by the calculation element 12 is represented with various parameters. When five-angle reflectance data is input, a graph can be output in a space where values such as CIELab, CIELch, XYZ, FF value, IV value, and SV value of five-angles, which are automatically calculated, are defined as axes.

(Functions of Color Distribution Design Assistance System)

The following describes functions of the thus configured color distribution design assistance system. Color distribution is designed for various objects to which design by coating is provided, including a vehicle body.

Color at the object surface at one or more designated angles is designated via the second input device 212.

For instance, the operation of an interface via the second input device 212 designates a type of a color space. Then, an image representing the designated color space is displayed on the first output device 221. The color space as the designation target includes a color space configuring various known color systems including a RGB color system, a XYZ color system, a L*u*v* color system and L*a*b* color system.

Then, any position in the designated color space displayed on the first output device 221 is designated via the second input device 212, whereby a color represented by coordinates of the designated position is set as color of the object surface at the designated variation angle. Such setting of color makes the calculation element 12 set spectral reflectance at the designated variation angle, and this spectral reflectance becomes the base of calculation for color distribution.

One or more pieces of landscape photographs may be displayed on an output device 22 and points on the photographs may be designated, whereby color of the photograph at the designated points may be set as color of the object surface at the designated variation angle.

Figure 3:
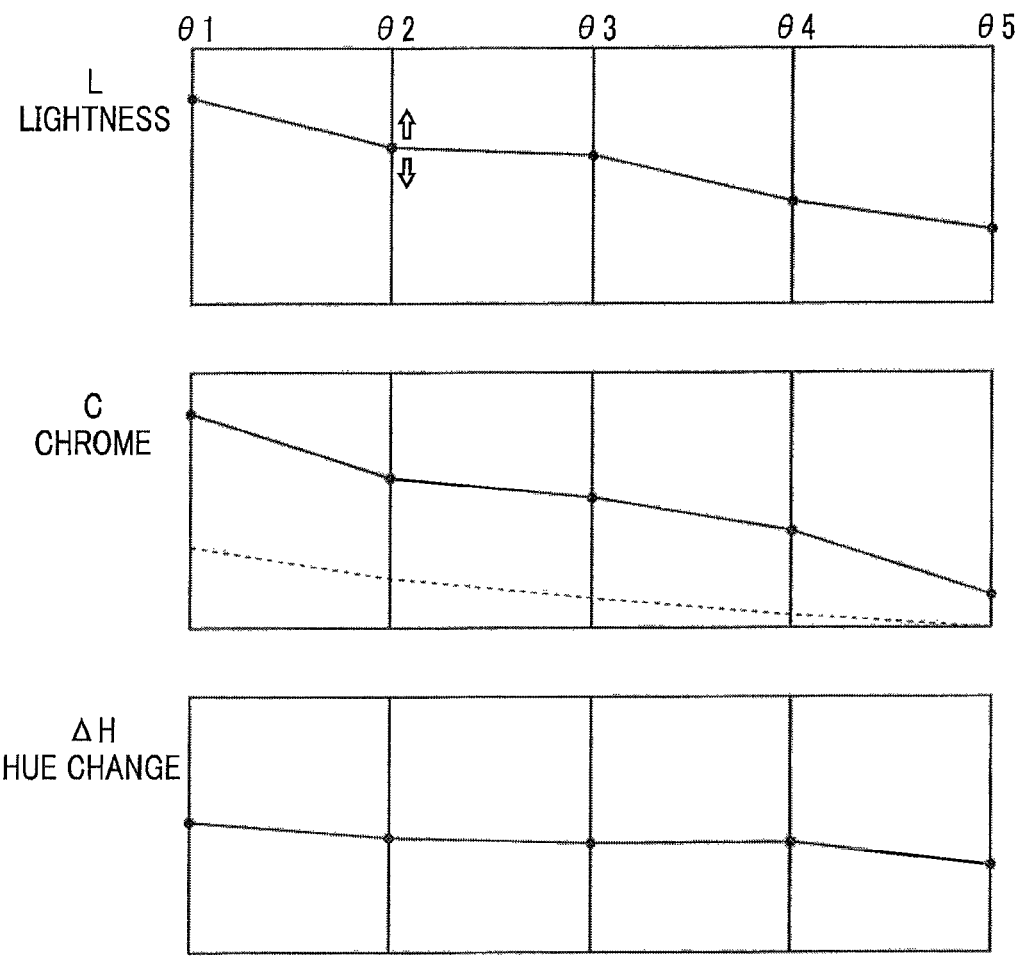
FIG. 3 describes how to set a first color factor.

Additionally, as shown in FIG. 3, the first output device 221 displays an interface representing values of L (Lightness), C (Chroma) and ΔH (Hue change relative to a certain variation angle) of five designated variation angles $\theta_1$ to $\theta_5$ in the LCH color system. For instance, $\theta_1=15°$, $\theta_2=25°$, $\theta_3=45°$, $\theta_4=75°$, and $\theta_5=110°$. Then at least a part of the plots is changed in position via the second input device 212, whereby new color corresponding to the position of the changed plot is set as color of the object at designated variation angle $\theta_i$.

A dotted line shown in the adjustment field of C (chroma) represents a "chroma limit line" defining the range of possible values of C (chroma) with consideration given to the current values of L (Lightness) and H (Hue). A reflectance function $f(\lambda)$ is defined, which is a function of a variable $\lambda$ created based on an approximate curve obtained from a data group of the measured values of reflectance. For a D65 light source having the viewing angle 2° or 10°, L*a*b* and LCH are determined Functions $\alpha(f)$, $\beta(f)$ and $\gamma(f)$ representing L value, C value and H value, respectively, which are determined for each function $f(\lambda)$ are defined.

Group $\alpha^{-1}(a)$ of functions f meeting $0 < a \le 160$, group $\gamma^{-1}(c)$ of functions f meeting $0 \le c \le 100$, and group $\beta^{-1}(b)$ of functions f meeting $0° \le b \le 360°$ are defined. Then, the possible range of c values that are determined by the group $\gamma^{-1}(c)$ under the conditions of $\alpha^{-1}(a)=\beta^{-1}(b)$ is found as the chroma limit range.

Based on color at variation angle designated via the second input device 212 as well as the variation angle distribution at the object surface stored in the first storage device 111 and the spectral reflectance of the coating layer, the calculation element 12 calculates the color distribution in accordance with the variation angle θ of the object surface. Color is calculated as a composite result of a base color of the object itself and color of reflection. The calculation result by the calculation element 12 is stored in the second storage device 112.

The base color is color visually recognized as a result of diffusive reflection of light emitted from a light source at the coating layer, and is calculated based on the spectral reflectance of the coating layer. For instance, letting designated color at a designated variation angle $\theta_i$ (i=1 to 5) is base color of the object surface, base color at another variation angle $\theta$ ($\theta_k < \theta < \theta_{k+1}$) can be calculated by appropriate interpolation such as linear interpolation. The color of reflection is color visually recognized as a result of reflection of light emitted from a light source at the object surface specularly, and is calculated based on the regular reflectance of the coating layer.

In the case where the coating layer includes a design coating layer having color and a clear coating layer, all optical characteristics such as a refractive index at each coating layer are considered, whereby color distribution can be calculated in accordance with variation angle θ at the object surface.

Figure 4B:
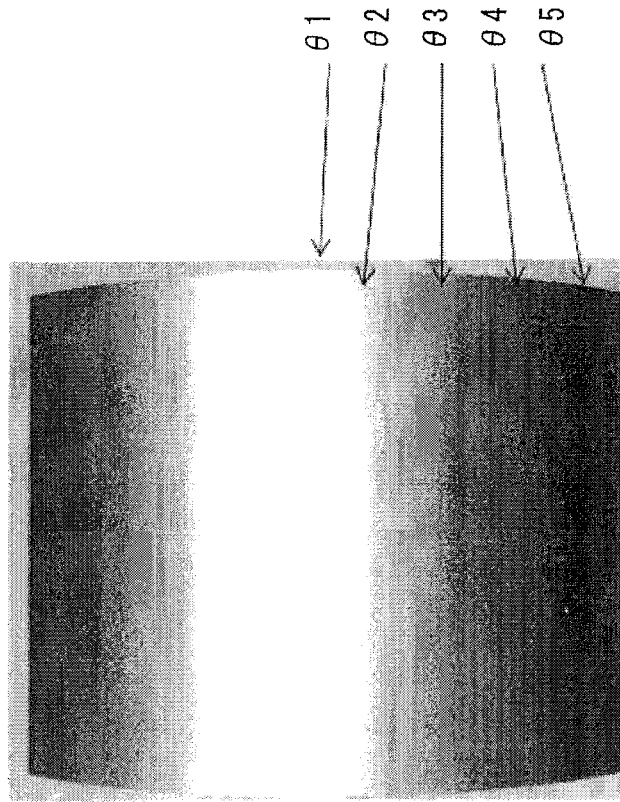
FIG. 4 describes a display mode of a calculation result of first color distribution.
Figure 4A:
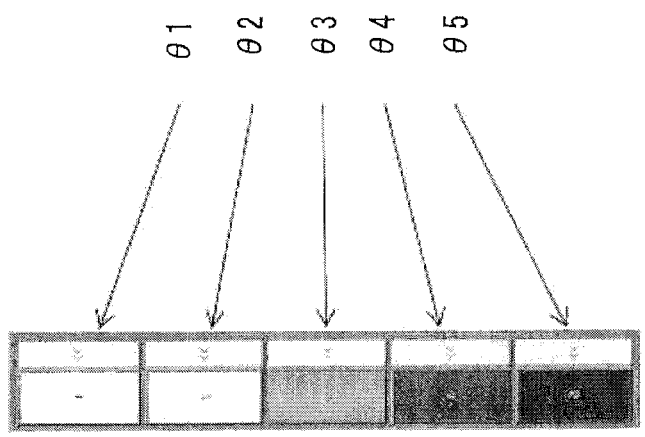

For instance, as shown in FIG. 4(a), a strip-shaped diagram showing the color distribution at the variation angle range $\theta_1$ to $\theta_5$ at the object surface is displayed on the first output device 221 as a calculation result. In another example, as shown in FIG. 4(b), a diagram indicating color distribution at a curved face curved like an arc shape while keeping constant curvature that is viewed from its front face may be displayed on the first output device 221 as a result of the calculation result of color distribution in accordance with the variation angle θ at the object surface. This allows a designer to visually recognize a changing mode of color at the object surface in accordance with a change in variation angle θ of the coating face intuitively.

At least one of the irradiation direction of light and the visual line direction may be changed via the third input device 213 to change the variation angle distribution at the object surface.

A distribution mode of the particle group included in the coating layer as well as shape characteristics and optical characteristics of the particles making up the particle group are further designated virtually via the second input device 212. These designated factors are to determine the color distribution in accordance with variation angle θ at the object surface so as to reflect the design effect or texture of the particle group included in the coating layer. These factors can be designated by inputting a numeric value or the like in the input field or choosing from options in a pull-down menu via the second input device 212 using the interface displayed on the first output device 221.

Exemplary shape characteristics of the particles include an average particle size of the particles as well as a dispersion value representing a particle-size distribution mode.

Exemplary optical characteristics of the particles include color, transmittance and the like of the particles. For instance, color of the particles is designated by designating any position in the color-space coordinate system displayed on the first output device 221 via the second input device 212.

A space between the object surface and the view point facing the same may be designated via the second input device 212, and then the calculation element 12 accordingly may correct the optical characteristics so that a large designated space means larger transmittance as the optical characteristics of the particles. That is, the optical characteristics of the particles may be indirectly designated by designating such a space.

Density of the particle group representing the number of particles per unit area of the coating layer may be designated as the distribution mode of the particle group. Assuming that the particles are shaped like a flat plate, a normal direction to the surface of the flat plate is considered as a random variable. Then, "normal-direction fluctuation" as dispersion of the random variable of the particle group may be designated as the distribution mode of the particle group (see FIG. 6(b)). This is a factor introduced to represent that texture of the object surface depends on the location of the view point, which is due to the particle group included in the coating layer.

Figure 5A:
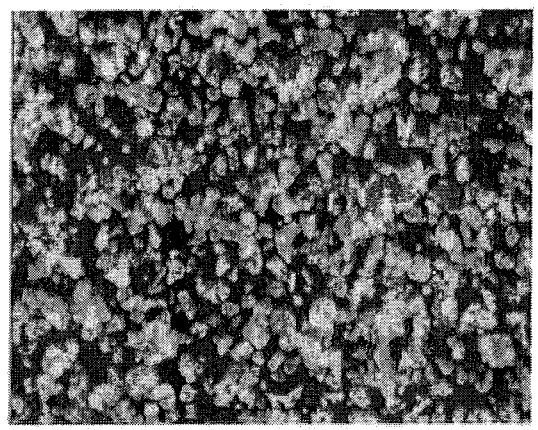
FIG. 5 describes how to set a second color factor.
Figure 5B:
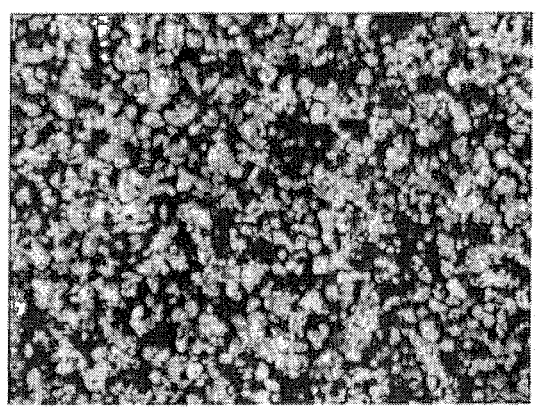

Data including a plurality of numeric values indicating states of a plurality of particle groups at the coating layer that are different in at least a part of the distribution mode, the shape characteristics and the optical characteristics of particles making up the particle groups as shown in FIG. 5(a) and FIG. 5(b) are read from the first storage device 111, and then are displayed on the first output device 221, among which numeric data is selected, whereby factors such as the distribution mode of a particle group may be indirectly designated.

Based on the aforementioned calculation result of the color distribution in accordance with variation angle θ of the object surface that is stored in the first storage device 111, in addition to the distribution mode of a particle group included in the coating layer, the shape characteristics and the optical characteristics of particles making up the particle group designated via the second input device 212, color distribution in accordance with variation angle θ of the object surface can be calculated. Such color distribution reflects the design effect or texture achieved by the particle group included in the coating layer. The color in this case is calculated as a composite result of the color of the object itself (base color) and the color of reflection as well as the color of particles and the color the object that is viewed through the particles.

Figure 6A:
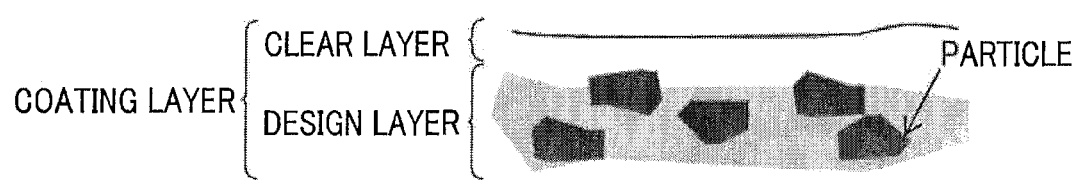
FIG. 6 describes how to calculate second color distribution.
Figure 6B:
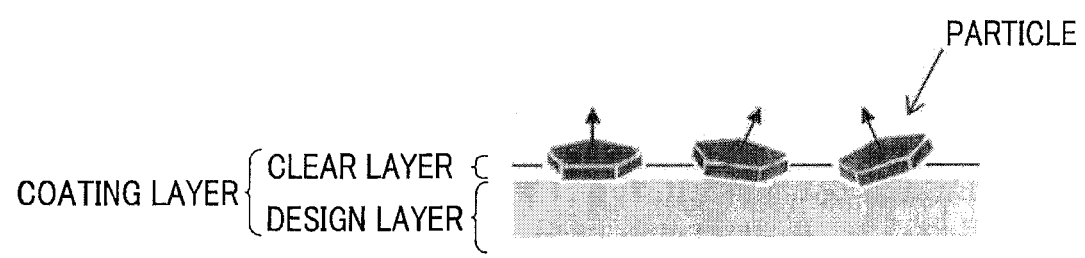

As shown in FIG. 6(a), the object surface actually has a structure including a design coating layer having individual particles embedded therein partially or entirely, on which a clear coating layer is overlaid. As for the drawing calculation, the color distribution is calculated under the assumption that flat-plate shaped particles are distributed on the clear coating layer as shown in FIG. 6(b). It is further assumed that particles have a certain degree of transmittance, although aluminum particles, for example, actually have transmittance of 0. This can reduce the calculation amount and allows the virtual change to be reflected on drawing by the output device in real time.

As shown in FIGS. 7(a) and 7(b), disappearance angle of particles due to Fresnel reflection, resulting from a difference in transmittance of the particles, is represented by scattering degree (or spatial dispersion or spatial distribution mode) of the particles. This can remove particles that cannot be viewed from the calculation target, and so simulation calculation for the particles to contribute to the design effect of the coating color can be implemented while suppressing the calculation amount. The calculation amount for design effect such as particle scattering degree and transmittance depending on the color group, size group and particle type of the particles can be suppressed, and so calculation load of the system can be reduced.

(Advantageous Effects of the Present Invention)

According to a color distribution design system 1 of the present invention, a distribution mode of a particle group included in a coating layer of the object surface as well as shape characteristics and optical characteristics of particles making up the particle group are designated via an input device 21. Then, the calculation element 12 calculates color distribution in accordance with variation angle at the object surface reflecting texture or design effect due to the existence of the particle group based on the designated factors and color distribution in accordance with variation angle at the object surface stored in the first storage device 111. Then, the first output device 221 displays the calculation result.

This can assist a designer in designing color distribution at the object surface while considering the relationship between the characteristics of the particle group included in paint and characteristics of individual particles making up the particle group and the design effect or texture at the object surface achieved by the particle group.

For instance, a designer can recognize texture of particles assumed to have a flat-plate shape and how particles having different transmittance as one of the optical characteristics appear in accordance with variation angle at the coating layer (see FIG. 7). As a result, a designer can be assisted in designing of color distribution at the object surface while allowing the designer to consider the fact that the color of the particles included in the coating layer such as lightness depends on the attitude of the particles with respect to the incident direction and the visual line direction.

A designer further can recognize the relationship between distance of the view point from the object surface and the color distribution in accordance with variation angle at the object surface, including texture of the object surface resulting from the particles included in the coating layer. As a result, a designer can be assisted in designing of color distribution in accordance with variation angle θ of the object surface while considering the fact that the color of the particles included in the coating layer such as lightness depends on the distance of the view point from the object.

Information of such designated distribution mode of the particle group as well as designated shape characteristics and designated optical characteristics of the particles can be used when choosing a particle group to be included in paint to implement color distribution as the designer intended and accordingly can be used as direct guideline to design the paint. In this way, this can bring efficiency to develop paint.

Assuming that particles are on a flat plate, in response to the input of information on the particles such as the size, the color or the distribution density, a designer can be assisted in designing of the design effect of the particle distribution while visually recognizing the relationship with color distribution in accordance with variation angle of the object surface, including the texture resulting from the particles for each material of the particles.

A calculation result of computer graphics in the light incident direction and the visual line direction is added, whereby a distribution system assisting in designing while enabling a designer to view color distribution of the object surface that is bent like a cylinder and allowing the designer to consider the fact of different physical properties such as lightness of particles included in the coating layer, variation angle transmittance and smoothness change in accordance with the distance and the direction.

The variation angle transmittance of particles refers to Fresnel reflectance, and a phenomenon where the existence of particles included in a pigment layer becomes invisible in accordance with a refractive index of one or both of the clear layer and the pigment layer and depending on the angular direction, which is due to surface reflection of one or both of the clear layer and the pigment layer, can be represented using one parameter of "particle spread".

For instance, in the case of particles having transparency such as pearls, such particles become invisible with a slight change in angle from the vicinity of specular reflection. A combination of transmittance of the particles and surface reflectance characteristics of one or both of the clear layer and the pigment layer can be collected into one parameter of particle spread, whereby characteristics of the particles that are important for design can be represented roughly.

The invention claimed is:

1. A color distribution design assistance system, comprising:
    a storage device configured to store color distribution in accordance with variation angle of a coating layer of an object surface, a distribution mode of a particle group included in the coating layer, and shape characteristics and optical characteristics of particles making up the particle group;
    an input device enabling virtual designation of information on a design effect at the object surface;
    a calculation element configured to perform conversion into information equal to actual data in response to the virtual designation of information on a design effect via the input device, and perform particle appearance effect calculation corresponding to a distance and a direction where particles contained in a pigment layer become invisible based on the color distribution in accordance with variation angle of the coating layer of the object surface, the distribution mode of the particle group, and the shape characteristics and optical characteristics of the particles, thus calculating color distribution in accordance with variation angle of the object surface; and
    an output device configured to display the color distribution in accordance with variation angle of the object surface that is calculated by the calculation element, wherein
    the storage device is configured to store a plurality of sample images each indicating a state at the coating layer of each particle group of a plurality of the particle groups that are different from each other in at least two parts of a distribution mode and shape characteristics and optical characteristics of particles making up the particle groups,
    the output device is configured to display the plurality of sample images stored in the storage device, and
    the input device is configured to enable virtual designation of the distribution mode of the particle group as well as the shape characteristics and the optical characteristics of the particles making up the particle group by designation from the plurality of sample images displayed on the output device.

2. The color distribution design assistance system according to claim 1, wherein
    the output device is configured to draw disappearance angle of particles due to Fresnel reflection resulting from a difference in transmittance of the particles with a scattering degree of the particles, and
    the calculation element is configured to remove particles that become invisible in accordance with disappearance angle and perform calculation to contribute to a design effect of coating color only.

3. The color distribution design assistance system according to claim 1, wherein the input device is configured to enable designation of a space between the object surface and a view point facing the object surface, and the calculation element is configured to correct the optical characteristics so that transmittance included in the optical characteristics of the particles making up the particle group increases with an increase in the space designated via the input device, and then calculate color distribution in accordance with variation angle of the object surface based on the corrected optical characteristics.

4. The color distribution design assistance system according to claim 1, wherein
    the input device is configured to enable designation of color in accordance with a plurality of designated variation angles of the coating layer, and
    the calculation element is configured to calculate color distribution in accordance with variation angle of the coating layer including color distribution in a variation angle range other than the designated variation angles by interpolation based on a designated color corresponding to the designated variation angles via the input device.

5. The color distribution design assistance system according to claim 1, wherein
    the calculation element is configured to perform the particle appearance effect calculation using transparency of the particles in accordance with variation angle at the object surface due to the optical characteristics of the particles and surface reflection at a part covered with pigment made up of invisible microparticles in the coating layer.

6. The color distribution design assistance system according to claim 1, wherein the optical characteristics of the particles include a transmittance of the particles.

* * * * *